United States Patent [19]
Kriechbaum et al.

[11] Patent Number: 5,885,510
[45] Date of Patent: Mar. 23, 1999

[54] METHODS OF MAKING REFRACTORY BODIES

[75] Inventors: Gangolf W. Kriechbaum, Schÿneck; Volker Gnauck, Franz-Boegler-Weg, both of Germany

[73] Assignee: Alcoa Chemie GmbH, Frankfurt, Germany

[21] Appl. No.: 797,377

[22] Filed: Feb. 7, 1997

[51] Int. Cl.$^6$ .................................................... B28B 3/00
[52] U.S. Cl. ............................................ 264/333; 264/426
[58] Field of Search .................. 264/129, 263, 264/333, 642

[56] References Cited

U.S. PATENT DOCUMENTS

| | | | |
|---|---|---|---|
| 1,507,085 | 9/1924 | Newman | 264/263 |
| 1,856,906 | 5/1932 | Carvel | 264/263 |
| 3,324,207 | 6/1967 | Shilstone | 264/263 |
| 3,837,630 | 9/1974 | Kohl et al. | 266/43 |
| 3,951,082 | 4/1976 | Leggett et al. | 110/8 A |
| 4,110,388 | 8/1978 | Wiene | 264/263 |
| 4,125,979 | 11/1978 | McLaughlin | 264/263 |
| 4,442,219 | 4/1984 | TenEyck et al. | 501/95 |
| 4,568,594 | 2/1986 | Hordonneau et al. | 428/113 |
| 4,647,357 | 3/1987 | Dewing | 204/243 |
| 4,737,254 | 4/1988 | Gesing et al. | 204/243 |
| 4,799,652 | 1/1989 | Daussan et al. | 266/275 |
| 4,908,234 | 3/1990 | Daussan et al. | 427/236 |
| 5,155,070 | 10/1992 | Skorupa | 501/103 |
| 5,158,726 | 10/1992 | Saita et al. | 264/60 |
| 5,160,692 | 11/1992 | Daussan et al. | 266/44 |
| 5,296,187 | 3/1994 | Hackman | 264/257 |
| 5,308,572 | 5/1994 | Hackman | 264/510 |
| 5,362,692 | 11/1994 | Bugajski et al. | 501/103 |
| 5,450,700 | 9/1995 | Hackman | 52/425 |
| 5,571,628 | 11/1996 | Hackman | 428/605 |

FOREIGN PATENT DOCUMENTS

| | | |
|---|---|---|
| 2393637 | 5/1979 | France . |
| 2585273 | 1/1987 | France . |
| 2613256 | 10/1988 | France . |
| 2619323 | 2/1989 | France . |

*Primary Examiner*—Christopher A. Fiorilla
*Attorney, Agent, or Firm*—David W. Pearce-Smith

[57] ABSTRACT

A method for manufacturing a reinforced cementitious columnar structure comprising: (a) providing a mold having a cavity which corresponds to a shape and size of the columnar structure; (b) filling the cavity with dry coarse particulates to form a formed dry body comprising 50–90 volume percent coarse particulates having a particle size between about 1 and 60 mm so as to form a core volume; (c) introducing a slurry of cementitious material containing an amount of fine material which has been determined beforehand, the fine material having a particle size smaller than the size of interstitial voids of the coarse particulates into the core volume, the fine material and the cementitious material filling the core volume and the cementitious material infiltirating and encapsulating the coarse particulates, and the fine material remaining within the core volume; (d) curing the slurry of cementitious material to form the reinforced cementitious columnar structure; and (e) separating the mold from the reinforced cementitious columnar structure.

9 Claims, No Drawings

METHODS OF MAKING REFRACTORY BODIES

TECHNICAL FIELD

The present invention relates to castable refractory compositions and methods of making refractory bodies. More particularly, the present invention relates to a process for producing a lining on the inner walls of vessels and furnaces intended to receive liquid metal, glass and the like.

BACKGROUND ART

A number of processes for producing a lining on the inner walls of a metallurgical vessel are known. Thus, for example, there is known, according to French Patent 2,393, 637, a process in which an aqueous and pasty mixture capable of setting, containing inorganic particles, optionally fibers, and an organic and/or inorganic binder, is applied by molding, tamping or projecting with the trowel or pneumatic or other projecting to the inside of a metallurgical vessel such as a casting tundish. The mixture of particles sinters in contact with the liquid metal, and this ensures the cohesion of the lining.

According to French Patents 2,585,273, 2,613,256 and 2,619,323 there is also known a process according to which at least two layers of different compositions are applied to the inside of the metallurgical vessel, each being applied by projecting an aqueous and pasty mixture capable of setting of the above-mentioned type.

These processes, which otherwise give the users complete satisfaction, nevertheless present a disadvantage: at least all the wetting water employed for forming the aqueous mixture (s) must be removed by drying, and this involves an immobilization time and an expenditure of energy, neither of which can be ignored.

There is also known a process according to which a template is placed inside a metallurgical vessel, a material consisting of refractory particles and of a heat-curable binder is projected pneumatically between the template and the inner walls of the vessel, and heating is then applied while the template is left in place to cause the binder to set, and the template is finally removed. The cast material contains an inorganic compound containing water of crystallization.

It is also known that refractory bodies can be made by casting of refractory concretes either by vibration casting of a wet concrete or by vibration-free casting the concrete having a self-flowing consistency. In both approaches, all concrete materials need to be homogeneously mixed and wetted.

Mixing of concrete in a homogeneous way which has very fine and coarse particles is difficult to achieve and needs high energy mixing equipment. In case of vibration casting, the used molds have to be strong enough to withstand vibration. When casting more complicated linings, i.e., steel ladles, the casting has to be done in separate steps. The bottom of the ladle can be cast; and before the mold for the wall can be introduced, the castable has to reach sufficient mechanical strength.

Producing castables of highly porous materials by conventional vibration of vibration-free casting requires large quantities of mixing water (in excess of 15%) due to the fact that the mixing water fills up the open pores of the material. A high mixing water content in the castable means very long dry-out times and poor mechanical strength.

In order to increase thermal shock resistance, fibrous materials have been used in vibration and self-flowing materials. The use of fibrous materials increases the need for high levels of mixing water and makes casting more difficult. Very coarse materials which are beneficial for slag resistance due to their high density can only be used to a certain extent, because casting of concretes with a very high content of coarse materials is very difficult.

The aim of the present invention is to overcome the disadvantages of the known processes and to propose a process which is simple, rapid and economical to employ and which is particularly well suited to the production of a lining of a metallurgical or glass vessel.

These and other objects and advantages of the present invention will be more fully understood and appreciated with reference to the following description.

SUMMARY OF THE INVENTION

According to the process of the present invention, a castable refractory composition is characterized in that it comprises the following stages: (1) filling a mold with dry coarse particulates which can have a size between about 1 and 60 mm (millimeters) to form a formed dry body; (2) infiltrating the formed dly body with a slurry consisting of (i) a binder, (ii) water, and (iii) fine filler materials having a particle size distribution of between 0.0001 to 3 mm.

The volume percent of coarse dry particles is greater than 50 volume percent. Preferably, the volume percent of coarse dry particles is greater than 70 volume percent.

The slurry has a size distribution of less than 0.001 to 3 mm. Preferably, the slurry has a size distribution of less than 0.001 to 1.0 mm. The slurry may also contain dispersing agents, anti-foaming or foaming agents, plasticizers and de-airing components.

The slurry contains less than 15% water. It is preferable that the slurry contain less than 10% water, and most preferably less than 7% water. Thus, the infiltrated body will be substantially dry. The low amounts of water in the infiltrated body reduces the drying time and drying shrinkage of the castable refractory. Therefore, the installation of the refractory can be carried out very rapidly.

Another aspect of the invention is a castable refractory composition comprising: (a) 50–90 volume percent coarse particulates having a particle size between about 1 and 60 mm; and (b) 10–40 volume percent fine filler materials having a particle size distribution of less than 0.001 to 3 mm.

Yet another aspect of the invention is a method for manufacturing a reinforced cementitious columnar structure. The method comprises steps of: (a) providing a mold having a cavity which corresponds to a shape and size of the columnar structure; (b) filling the cavity with dry coarse particulates which can have a size between about 1 and 60 mm to form a formed dry body 50–90 volume percent coarse particulates having a particle size between about 1 and 60 mm so as to form a core volume; (c) introducing a slurry of cementitious material containing a predeternmined amount of fine material having a particle size smaller than the size of interstitial voids of the coarse particulates into the core volume, the fine material and the cementitious material filling the core volume and the cementitious material infiltrating and encapsulating the coarse particulates, and the fine material remaining within the core volume; (d) curing the slurry of cementitious material to form the reinforced cementitious columnar structure; and (e) separating the mold from the reinforced cementitious columnar structure.

Other characteristics and advantages of the invention will appear further in the detailed description below.

Mode for Carrying Out the Invention

The present invention is a castable refractory composition characterized in that it comprises the following stages: (1) filling a mold with dry coarse particulates which can have a size between about 1 and 60 mm to form a formed dry body; (2) infiltrating the formed dry body with a slurry consisting of (i) a binder, (ii) water, and (iii) fine filler materials.

The coarse particulates useful in practicing the present invention are selected from the group comprising fused alumina, sintered alumina (tabular alumina), whole alumina balls, fused bauxite, fused and sintered mullite, fused and sintered magnesia, fused and sintered magnesia aluminum spinel, fused and sintered zirconia, refractory bauxites, refractory andalusite, refractory chamotte, silicon carbide or combinations thereof.

The coarse particulates useful in practicing the present invention can have any shape. They can be spherical, blocky, rectangular or even fibrous. In addition, they may be used alone or in combination.

The binder used in the slurry is selected from the group comprising calcium aluminate cement, potland cement, hydratable alumina and combinations thereof.

The fine materials used in the slurry are selected form the group comprising reactive aluminas, calcined alumina, tabular alumina, fused alumina, mullite, carbon (graphite carbon black), silicon carbide, zirconium dioxide, magnesium oxide, aluminum silicates (chaimotte, andalusite, micro silica, bauxite, chromium oxide) and combinations thereof.

The slurry may also contain dispersing agents, plasticizers, anti-foaming or foaming agents and de-airing components. These agents are well known in the art.

The slurry contains less than 15% water. It is preferable that the slurry contain less than 10% water and most preferably less than 7% water.

The slurry used in practicing the present invention has a size distribution in the range of about 0.001 to 3 mm and preferably in the range of 0.001 to 1.0 mm.

In operation, the coarse materials are placed in a mold. The coarse material will fill over 50 volume percent of the mold and preferably above 70 volume percent of the mold. The exact volume filling will depend on the particle sizes and shapes.

The coarse materials may be placed in the mold using a wide variety of means. Pressurized hoppers, a projecting machine of the cylinder barrel type, suitable for conveying materials and, more generally, any combination of known means of conveying and of handling capable of routing the material to be spread over the entire mold or part of mold to be filled.

Next, the slurry is separately mixed using a conventional mixing means and then poured into the filled mold. The slurry will contain less than 15% water. The fluid nature of the slurry will cause it to fill the voids between the coarse particles to form a mass. Thus, the infiltrated body will have a much lower water content than the slurry, and the infiltrated body will be substantially dry. The low amounts of water in the infiltrated body reduce the drying time and drying shrinkage of the castable refractory. Therefore, the installation of the refractory can be carried out very rapidly.

The invention is obviously not limited to the embodiments just described, and numerous changes and modifications can be made to the latter without departing from the scope of the invention.

What is believed to be the best mode of the invention has been described above. However, it will be apparent to those skilled in the art that numerous variations of the type described could be made to the present invention without departing from the spirit of the invention. The scope of the present invention is defined by the broad general meaning of the terms in which the claims are expressed.

What is claimed is:

1. A method for manufacturing a reinforced cementitious columnar structure comprising:

(a) providing a mold having a cavity which corresponds to a shape and size of said columnar structure;

(b) filling said cavity with dry coarse palticulates to form a formed dry body comprising 50–90 volume percent coarse palticulates having a particle size between about 1 and 60 mm so as to form a core volume;

(c) introducing a slurry of cementitious material containing an amount of fine material which has been determined beforehand, said fine material having a particle size smaller than the size of interstitial voids of said coarse particulates into said core volume, said fine material and said cementitious material filling said core volume and said cementitious material infiltrating and encapsulating said coarse paiticulates, without the use of vibratory equipment, and said fine material remaining within said core volume;

(d) curing said slurry of cementitious material to form said reinforced cementitious columnar structure; and (e) separating said mold from said reinforced cementitious columnar structure.

2. The method for manufacturing a reinforced cementitious columnar structure of claim 1 in which the volume of coarse material is between 70–85% of said cavity.

3. The method for manufacturing a reinforced cementitious columnar structure of claim 1 in which the volume of fine material is between 15–30% of said cavity.

4. The method for manufacturing a reinforced cementitious columnar structure of claim 1 in which the coarse particulates have a particle size between about 1 and 15 mm.

5. The method for manufacturing a reinforced cementitious columnar structure of claim 1 in which sluiny contains dispersing agents, anti-foaming or foaming agents and de-airing components.

6. The method for manufacturing a reinforced cementitious columnar structure of claim 1 in which the slurry is less than 15% water.

7. The method for manufacturing a reinforced cementitious columnar structure of claim 1 in which the slurry less than 10% water.

8. The method for manufacturing a reinforced cementitious columnar structure of claim 1 in which the slurry less than 7% water.

9. The method of claim 1 in which said introducing is accomplished by pouring said slury into said mold.

* * * * *